United States Patent
Chiu

(10) Patent No.: US 12,492,704 B1
(45) Date of Patent: Dec. 9, 2025

(54) COMPRESSOR TEMPERATURE PROTECTION MODULE AND PROTECTION SYSTEM THEREOF

(71) Applicant: NEW WIDETECH INDUSTRIES CO., LTD., New Taipei (TW)

(72) Inventor: Ming-Tsung Chiu, New Taipei (TW)

(73) Assignee: NEW WIDETECH INDUSTRIES CO., LTD., New Taipei (TW)

( * ) Notice: Subject to any disclaimer, the term of this patent is extended or adjusted under 35 U.S.C. 154(b) by 0 days.

(21) Appl. No.: 18/820,889

(22) Filed: Aug. 30, 2024

(51) Int. Cl.
*F04D 27/00* (2006.01)

(52) U.S. Cl.
CPC ......... *F04D 27/008* (2013.01); *F04D 27/006* (2013.01)

(58) Field of Classification Search
CPC ......... F04D 27/008; F24F 11/86; F24F 11/89; F24F 2110/10
See application file for complete search history.

(56) References Cited

U.S. PATENT DOCUMENTS

| | | | | |
|---|---|---|---|---|
| 3,974,426 A | * | 8/1976 | Gingras | G05B 11/32 327/512 |
| 4,236,084 A | * | 11/1980 | Gingras | G05B 11/32 236/47 |
| 8,964,338 B2 | * | 2/2015 | Wallis | F04C 28/28 318/434 |
| 2020/0088419 A1 | * | 3/2020 | Henderson | F24F 1/0059 |

\* cited by examiner

*Primary Examiner* — Nathaniel E Wiehe
*Assistant Examiner* — Jackson N Gillenwaters
(74) *Attorney, Agent, or Firm* — Birch, Stewart, Kolasch & Birch, LLP

(57) ABSTRACT

A compressor temperature protection module and protection system thereof, wherein the module includes an automatic temperature sensing switch that senses a first temperature in a compressor and a passive temperature sensing switch that senses a second temperature on the compressor. When the passive temperature sensing switch senses the second temperature is greater than a second default value, the passive temperature sensing switch automatically severs a connection between a direct current (DC) power source and a processor module. When the automatic temperature sensing switch senses the first temperature within the compressor is greater than a first default value, the automatic temperature sensing switch automatically severs a connection between the compressor and a power supply. Afterwards, when the first temperature becomes less than the first default value, the automatic temperature sensing switch electrically connects to the control switch of the control module.

8 Claims, 6 Drawing Sheets

COMPRESSOR TEMPERATURE PROTECTION MODULE AND PROTECTION SYSTEM THEREOF

BACKGROUND OF THE INVENTION

1. Field of the Invention

The present invention relates to a protection module and protection system, and more particularly a compressor temperature protection module and protection system thereof.

2. Description of the Related Art

With reference to FIGS. 5A and 5B, FIG. 5A presents a circuit diagram of a conventional automatic temperature sensing switch 16 inside of a compressor M, and FIG. 5B presents a cross-sectional view of a structure of the conventional automatic temperature sensing switch 16.

According to FIGS. 5A and 5B, the compressor M includes a compressor motor 10 and the conventional automatic temperature sensing switch 16. Inside of the compressor M, the conventional automatic temperature sensing switch 16 includes an insulator shell 161, a sealed inner-shell 162, a first sensing switch pin 163, a second sensing switch pin 164, and a temperature sensitive strip 165. The temperature sensitive strip 165 is a bimetallic strip. The insulator shell 161 encapsulates the sealed inner-shell 162. A first sensing switch contact 166 of the first sensing switch pin 163, a second sensing switch contact 167 of the first sensing switch pin 163, a sensing switch contact 168 of the second sensing switch pin 164, and the temperature sensitive strip 165 are all enclosed by the sealed inner-shell 162. As a result, the temperature sensitive strip 165, the first sensing switch contact 166, the second sensing switch contact 167, and the sensing switch contact 168 are isolated from an external environment.

Furthermore, the first sensing switch contact 166 is electrically connected to the sealed inner-shell 162, and thus the first sensing switch contact 166 is electrically connected to the second sensing switch contact 167 through the sealed inner-shell 162. The temperature sensitive strip 165 has two opposite sides, with one side fixed and connected to the second sensing switch contact 167 of the first sensing switch pin 163, and the other side contacting the sensing switch contact 168 of the second sensing switch pin 164. As a result, the first sensing switch pin 163 and the second sensing switch pin 164 are connected through the temperature sensitive strip 165, allowing a current of the power supply P to flow into the compressor M, and thus allowing the compressor M to execute its functions.

When the compressor M, as described above, is installed indoors, the compressor M may accumulate dust and thus prone to overheat. When the compressor M overheats, the temperature sensitive strip 165 within the compressor M absorbs heat and curls. Since one side of the temperature sensitive strip 165 is fixed to the second sensing switch contact 167 of the first sensing switch pin 163, the other side of the temperature sensitive strip 165 would curl and stop contacting the sensing switch contact 168 of the second sensing switch pin 164, thus disconnecting the temperature sensitive strip 165 and the second sensing switch pin 164. As such, the first sensing switch pin 163 and the second sensing switch pin 164 are disconnected with an open circuit.

After the compressor M cools down from being overheated, the temperature sensitive strip 165 would un-curl and once again contact the sensing switch contact 168 of the second sensing switch pin 164. The power supply P would then resume supplying current to the compressor M for starting the compressor M. However, repeated overheating and cooling down of the compressor M would force the compressor M to automatically switch on and off in succession, and switching the compressor M on and off in succession greatly increases a chance to damage the compressor M.

To prevent damaging the compressor M by automatically switching on and off the compressor M due to overheating and cooling down, a new temperature protection system for a compressor is in need.

SUMMARY OF THE INVENTION

To overcome the aforementioned problems, the present invention provides a compressor temperature protection module and protection system thereof.

The compressor temperature protection module of the present invention includes an automatic temperature sensing switch and a passive temperature sensing switch. The automatic temperature sensing switch is installed in a compressor for sensing a first temperature of the compressor, and the automatic temperature sensing switch is also electrically connected to a control switch of a control module. The passive temperature sensing switch is installed on the compressor for sensing a second temperature of the compressor, and the passive temperature sensing switch is electrically connected between a rectifier module and a processor module. The rectifier module is configured to electrically connect to a power supply for rectifying a voltage supplied by the power supply into a voltage signal. The rectifier module outputs the voltage signal to the processor module. The processor module is electrically connected to the control module. The processor module receives the voltage signal and allows the control module to generate a control signal according to the voltage signal. The control module outputs the control signal to the control switch for controlling the control switch to switch on or off according to the control signal. When the passive temperature sensing switch senses the second temperature greater than a second default value and when the automatic temperature sensing switch senses the first temperature greater than a first default value, the automatic temperature sensing switch automatically severs a connection with the control switch of the control module, and the passive temperature sensing switch severs a connection between the rectifier module and the processor module. After the automatic temperature sensing switch severs the connection with the control switch of the control module and the passive temperature sensing switch severs the connection between the rectifier module and the processor module, when the automatic temperature sensing switch senses the first temperature of the compressor to be less than the first default value, the automatic temperature sensing switch electrically connects to the control switch of the control module.

The compressor temperature protection system of the present invention includes a rectifier module, a passive temperature sensing switch, a processor module, a control module, a control switch, and an automatic temperature sensing switch. A power supply has a first contact and a second contact. The rectifier module is configured to electrically connect to the first contact of the power supply. The rectifier module rectifies a voltage supplied by the power supply into a voltage signal. The passive temperature sensing switch is installed on a compressor for sensing a second temperature of the compressor. The passive temperature sensing switch has a first pin and a second pin, and the first pin is electrically connected to the rectifier module. The processor module is electrically connected to the second pin of the passive temperature sensing switch. The processor module receives the voltage signal and processes the voltage signal. The control module is electrically connected to the processor module, and the control module generates a control signal according to the voltage signal. The control switch is electrically connected to the control module and is also configured to electrically connect to the second contact of the power supply. The control switch receives the control signal and switches on or off according to the control signal. The automatic temperature sensing switch is installed in the compressor for sensing a first temperature of the compressor. The automatic temperature sensing switch is also electrically connected to the control switch. When the passive temperature sensing switch senses the second temperature greater than a second default value and when the automatic temperature sensing switch senses the first temperature greater than a first default value, the automatic temperature sensing switch automatically severs a connection with the control switch of the control module, and the passive temperature sensing switch severs a connection between the rectifier module and the processor module. After the automatic temperature sensing switch severs the connection with the control switch of the control module and the passive temperature sensing switch severs the connection between the rectifier module and the processor module, when the automatic temperature sensing switch senses the first temperature of the compressor to be less than the first default value, the automatic temperature sensing switch electrically connects to the control switch of the control module.

Based on the above, when the compressor is overheating, the passive temperature sensing switch in the present invention immediately severs an electrical connection between the power supply and the processor module. This stops and keeps the compressor from working, thus preventing the automatic temperature sensing switch in the processor from repeatedly automatically switching the compressor on and off in succession as the compressor overheats and cools down. As a result, the compressor is more protected from being damaged due to switching on and off in succession, allowing the compressor to have longer life expectancy.

DETAILED DESCRIPTION OF THE INVENTION

Figure 1:
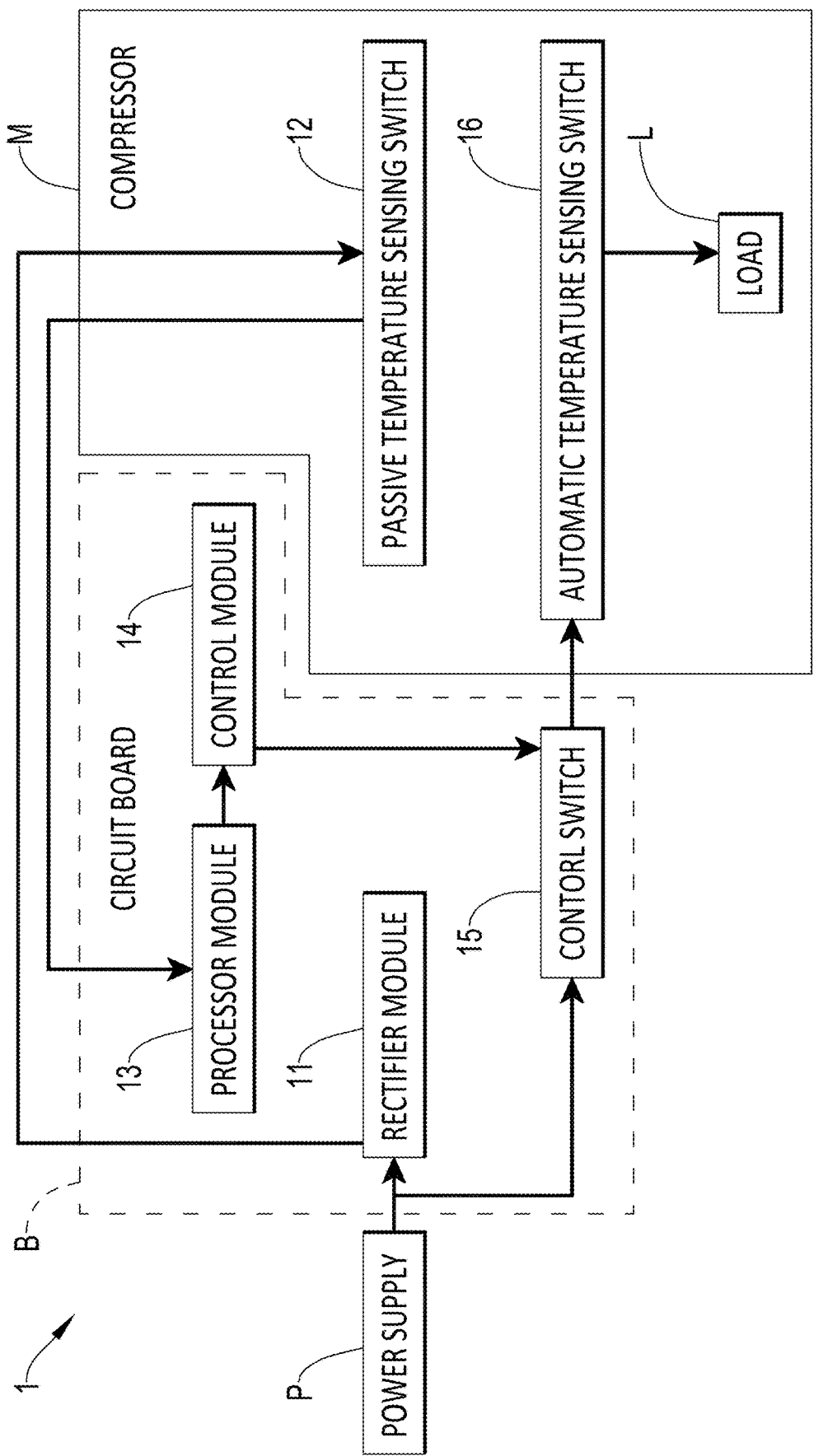
FIG. 1 is a block diagram of a compressor temperature protection system of the present invention.
Figure 5A:
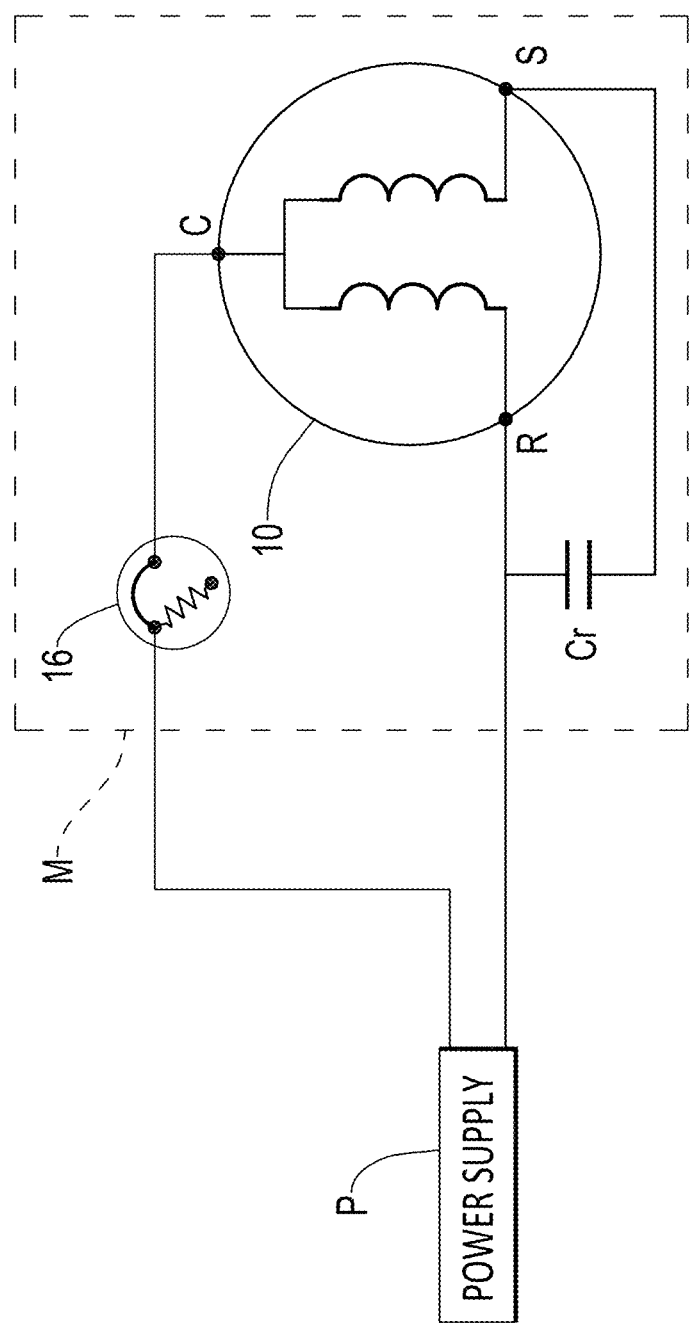
FIG. 5A is a circuit perspective view of a conventional automatic temperature sensing switch installed inside of a compressor.
Figure 5B:
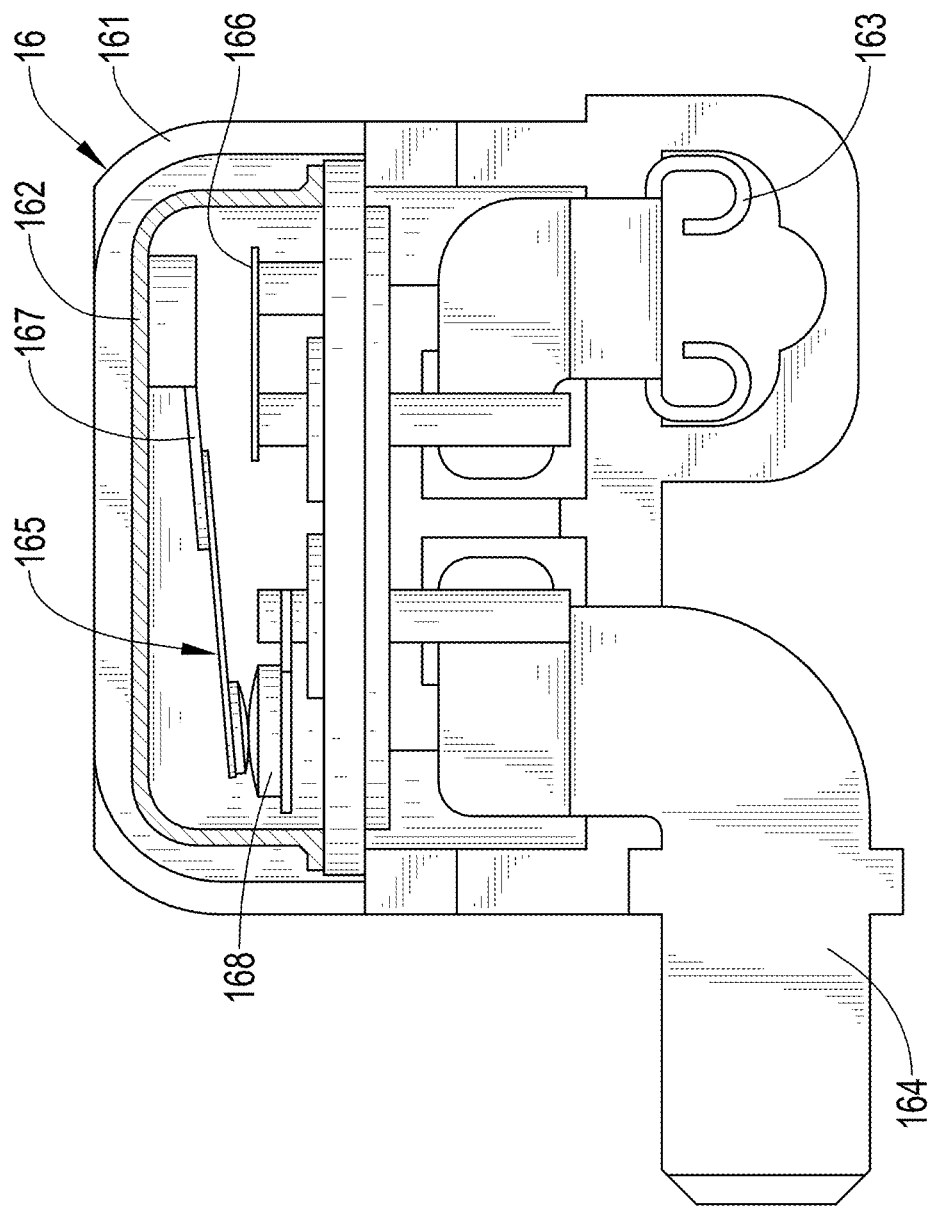
FIG. 5B is a cross-sectional perspective view of a structure of the conventional automatic temperature sensing switch.

With reference to FIGS. 1 and 5B, FIG. 1 presents a block diagram of a compressor temperature protection system 1 of the present invention. The compressor temperature protection system 1 includes a rectifier module 11, a passive temperature sensing switch 12, a processor module 13, a control module 14, a control switch 15, and an automatic temperature sensing switch 16. The passive temperature sensing switch 12 is a manual reset and one-shot thermostat. A power supply P has a first contact and a second contact.

The rectifier module 11 is electrically connected to the first contact of the power supply P. The rectifier module 11 rectifies a voltage supplied by the power supply P into a voltage signal. The passive temperature sensing switch 12 is installed on a compressor M for sensing a second temperature of a shell of the compressor M. The passive temperature sensing switch 12 has a first pin and a second pin, and the first pin is electrically connected to the rectifier module 11. The processor module 13 is electrically connected to the second pin of the passive temperature sensing switch 12. The processor module 13 receives the voltage signal and processes the voltage signal. The control module 14 is electrically connected to the processor module 13, and the control module 14 generates a control signal according to the voltage signal. The control switch 15 is electrically connected to the control module 14 and the second contact of the power supply P. The control switch 15 receives the control signal and switches on or off according to the control signal. The automatic temperature sensing switch 16 is installed inside the compressor M for sensing a first temperature of the compressor M. The automatic temperature sensing switch 16 is also electrically connected to the control switch 15 and a load L. The load L is a compressor motor 10.

When the passive temperature sensing switch 12 senses the second temperature of the shell of the compressor M greater than a second default value, or when the automatic temperature sensing switch 16 senses the first temperature of the compressor M greater than a first default value for the automatic temperature sensing switch 16, or when both the passive temperature sensing switch 12 senses the second temperature greater than the second default value and the automatic temperature sensing switch 16 senses the first temperature greater than the first default value, the automatic temperature sensing switch 16 automatically severs a power connection of the compressor M, or in other words, severs a connection with the control switch 15. Simultaneously, the passive temperature sensing switch 12 severs a connection between a direct current (DC) power source and the processor module 13 on a circuit board B, or in other words, severs the connection between the power supply P and the processor module 13. As such, the passive temperature sensing switch 12 severs the connection between the rectifier module 11 and the processor module 13.

After the automatic temperature sensing switch 16 severs the connection with the control switch 15 and the passive temperature sensing switch 12 severs the connection between the rectifier module 11 and the processor module 13, when the automatic temperature sensing switch 16 senses the first temperature of the compressor M to be less than or equal to the first default value for the automatic temperature sensing switch 16, the automatic temperature sensing switch 16 electrically connects the control switch 15.

Based on above, even though the automatic temperature sensing switch 16 electrically connects the control switch 15 when the first temperature of the compressor M is less than or equal to the first default value for the automatic temperature sensing switch 16, the passive temperature sensing switch 12 has already disconnected the rectifier module 11 and the processor module 13. In other words, the passive temperature sensing switch 12 maintains an open circuit between the rectifier module 11 and the processor module 13, and as a result, the processor module 13 lacks electricity supplied by the power supply P. The processor module 13 is thus unable to control the control module 14, and the uncontrolled control module 14 generates and outputs a switch-off control signal to the control switch 15. The control switch 15 obeys the switch-off control signal to stop conducting electricity, and thus the second contact of the power supply P also stays disconnected to the compressor M and unable to supply the compressor M with electricity.

When the passive temperature sensing switch 12 is configured to re-connect with the rectifier module 11 and the processor module 13, the processor module 13 would be supplied with electricity from the power supply P again, and further allows the processor module 13 to allow the control module 14 to generate a switch-on control signal to the control switch 15. The control switch 15 obeys the switch-on control signal to start conducting electricity. As a result, an electrical pathway from the first contact of the power supply P, through the rectifier module 11, the passive temperature sensing switch 12, the processor module 13, the control module 14, and the control switch 15, to the compressor M is established. Another electrical pathway from the second contact of the power supply P to the compressor M through the control switch 15 is also established.

Figure 2:
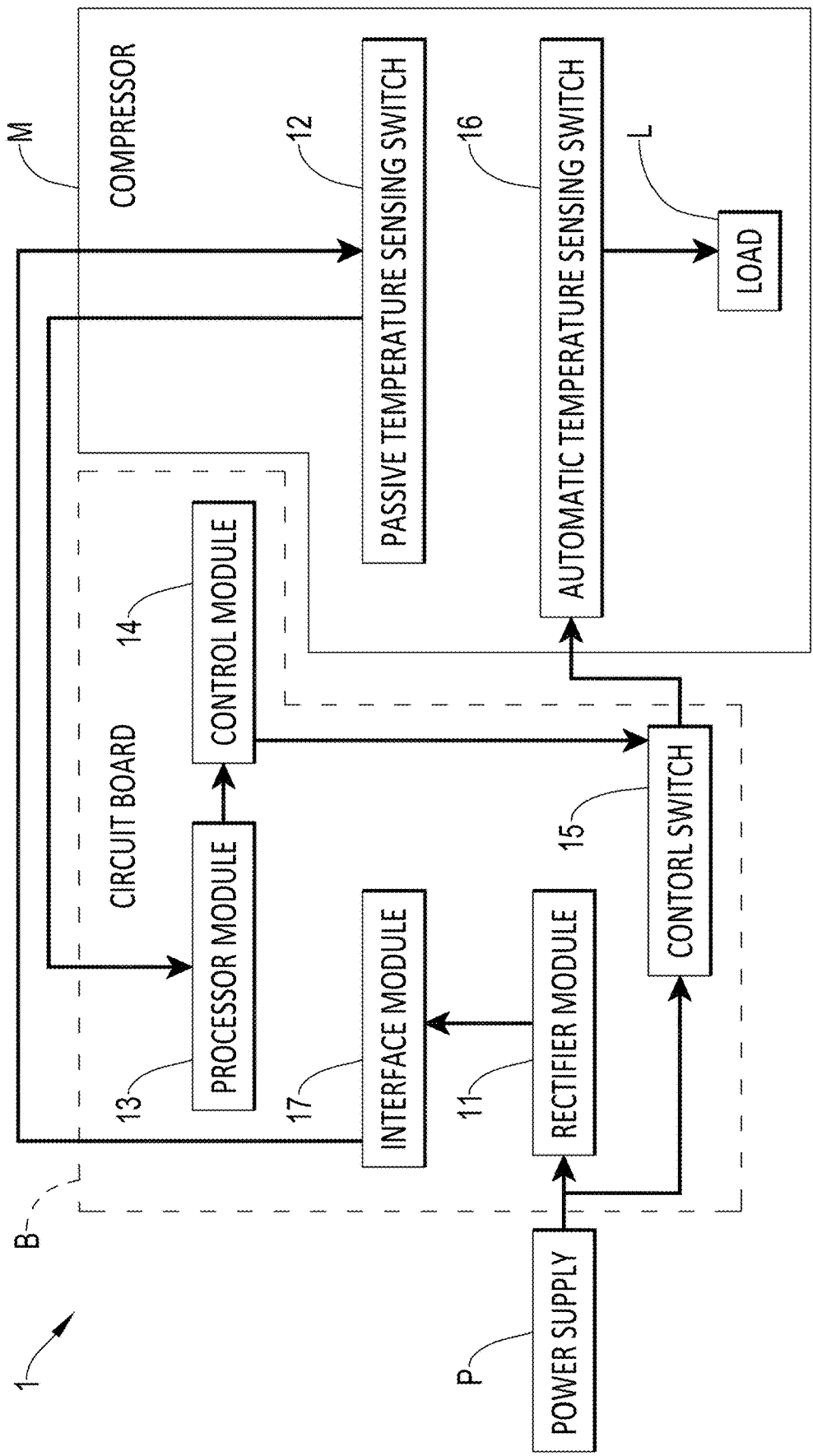
FIG. 2 is a block diagram of a rectifier module, a processor module, a control module, and a control switch mounted on a circuit board in the compressor temperature protection system of the present invention.
Figure 3:
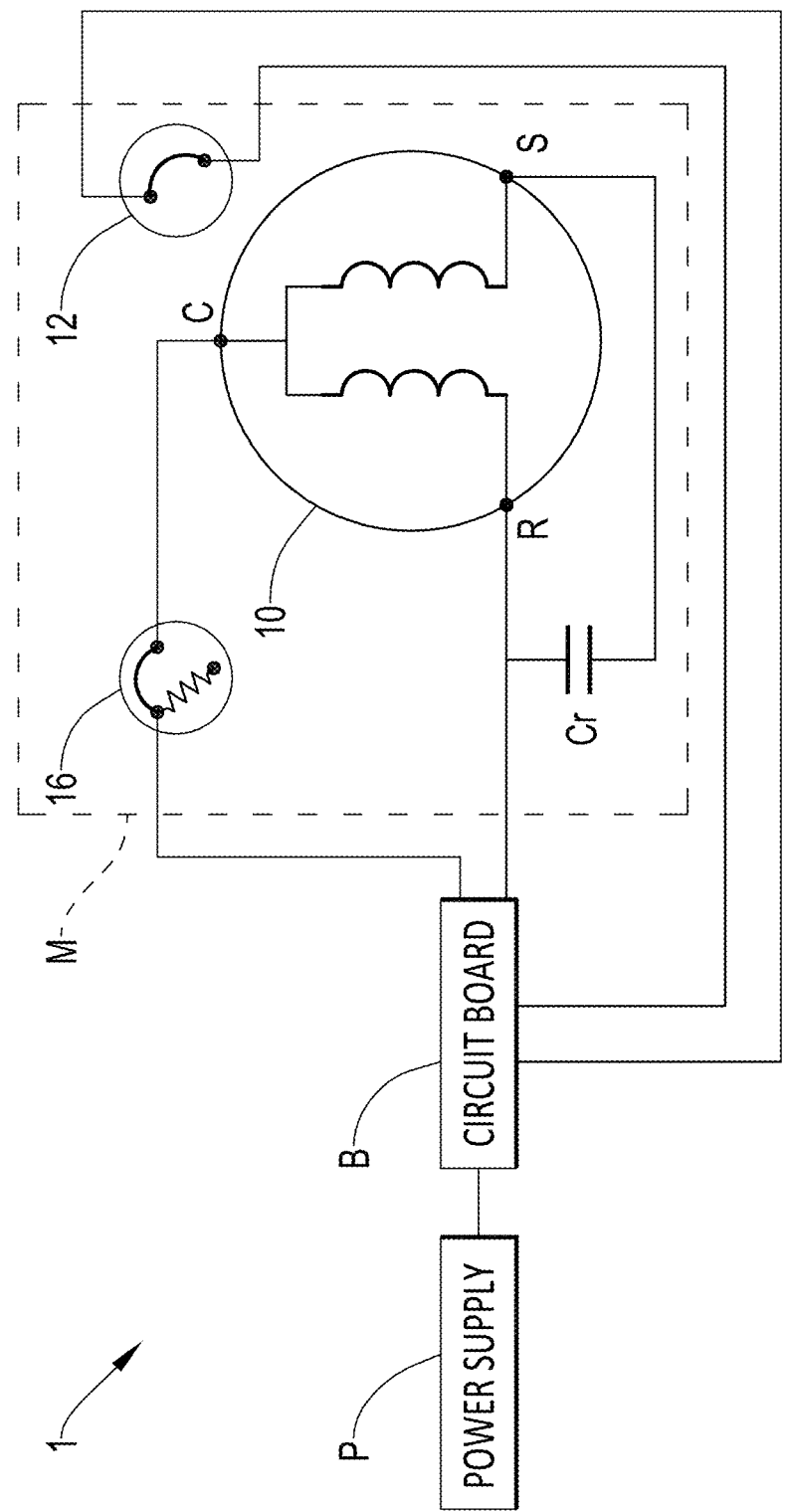
FIG. 3 is a circuit perspective view of a power supply electrically connected to the circuit board and a compressor.

With reference to FIGS. 1 through 3, in an embodiment, the rectifier module 11, the processor module 13, the control module 14, and the control switch 15 are mounted on a circuit board B. The circuit board B further includes an interface module 17. The interface module 17 is electrically connected between the rectifier module 11 and the passive temperature sensing switch 12. After the passive temperature sensing switch 12 is disconnected from the rectifier module 11 and the processor module 13, by resetting the interface module 17, the voltage supplied by the power supply P is able to once again flow through the rectifier module 11 and the interface module 17 to reach the passive temperature sensing switch 12 for resetting the passive temperature sensing switch 12. Once the passive temperature sensing switch 12 has been reset, the passive temperature sensing switch 12 allows for an electric connection between the interface module 17 and the processor module 13. As such, the processor module 13 is able to receive the voltage provided by the power supply P, which in terms allows the processor module 13 to allow the control module 14 to reset the control switch 15. The control switch 15 is reset to conduct electricity, allowing electricity provided by the power supply P to flow through the control switch 15 to the compressor M.

In the present embodiment, the passive temperature sensing switch 12 includes a manual reset mechanical switch. The manual reset mechanical switch allows for a user to manually move a mechanical switch of the manual reset mechanical switch, allowing the manual reset mechanical switch to reset and establish an electrical pathway between the rectifier module 11 and the processor module 13. In an embodiment, the manual reset mechanical switch is a manual reset and one-shot thermostat. The manual reset and one-shot thermostat allows for resetting electrical pathways under default values of various temperatures.

In the present embodiment, the automatic temperature sensing switch 16 is structurally identical to the automatic temperature sensing switch described in prior arts. However, when the first temperature of the compressor M is greater than the first default value, the second temperature would also be greater than the second default value. In other words, in this embodiment, the first default value and the second default value are equal to each other. A temperature sensitive strip 165 is a bimetallic strip. When the compressor M overheats, by having a side of the temperature sensitive strip 165 curl and stop contacting a sensing switch contact 168 of a second sensing switch pin 164, an open circuit is created between the temperature sensitive strip 165 and the second sensing switch pin 164, an open circuit is created between a first sensing switch pin 163 and the second sensing switch pin 164, and an open circuit is created between the automatic temperature sensing switch 16 and the control switch 15. After the first temperature of the compressor M is less than the first default value, in other words, when the compressor M cools down from being overheated, by having the side of the temperature sensitive strip 165 stop curling and start contacting the sensing switch contact 168 of the second sensing switch pin 164, the first sensing switch pin 163 would have an electric connection to the load L, and the second sensing switch pin 164 would have an electric connection to the control switch 15.

Figure 4:
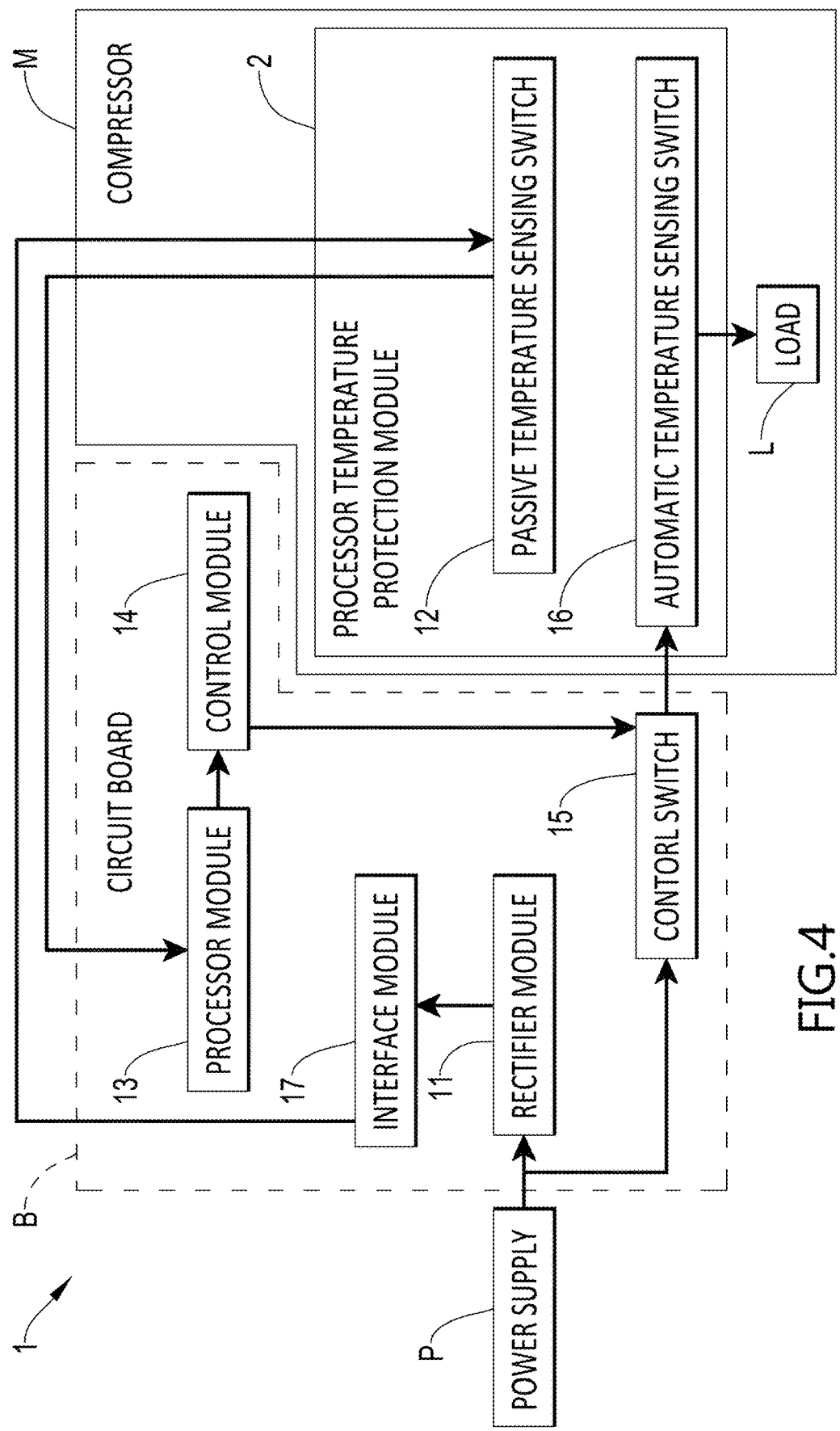
FIG. 4 is a block diagram of a compressor temperature protection module of the present invention.

With reference to FIG. 4, FIG. 4 presents a block diagram of a compressor temperature protection module 2 of the present invention. The compressor temperature protection module 2 includes an automatic temperature sensing switch 16 and a passive temperature sensing switch 12. The automatic temperature sensing switch 16 is installed in a compressor M for sensing a first temperature of the compressor M, and the automatic temperature sensing switch 16 is also electrically connected to a control switch 15 of a control module 14. The passive temperature sensing switch 12 is installed on the compressor M for sensing a temperature of a shell of the compressor M, and the passive temperature sensing switch 12 is electrically connected between a rectifier module 11 and a processor module 13.

Furthermore, as shown in FIG. 4, an interface module 17 is mounted on a circuit board B, and the interface module 17 is electrically connected between the rectifier module 11 and the passive temperature sensing switch 12. The rectifier module 11 is electrically connected to a power supply P for rectifying a voltage supplied by the power supply P into a voltage signal. The rectifier module 11 outputs the voltage signal, through the interface module 17 and the passive temperature sensing switch 12 to the processor module 13. The processor module 13 is electrically connected to the control module 14. The processor module 13 receives the voltage signal, processes the voltage signal, and allows the control module 14 to generate a control signal according to the voltage signal. The control module 14 outputs the control signal to the control switch 15 for controlling the control switch 15 to switch on or off according to the control signal.

When the automatic temperature sensing switch 16 senses the first temperature of the compressor M greater than a first default value for the automatic temperature sensing switch 16, the automatic temperature sensing switch 16 automatically severs a power connection of the compressor M. When the passive temperature sensing switch 12 senses the second temperature of the shell of the compressor M greater than a second default value, the passive temperature sensing switch 12 severs a connection between a direct current (DC) power source and the processor module 13 on the circuit board B, or in other words, severs the connection between the power supply P and the processor module 13. As such, the passive temperature sensing switch 12 severs the connection between the rectifier module 11 and the processor module 13. In an embodiment, the first default value and the second default value may be different default values.

After the automatic temperature sensing switch 16 severs a connection with the control switch 15 and the passive temperature sensing switch 12 severs the connection between the rectifier module 11 and the processor module 13, when the automatic temperature sensing switch 16 senses the first temperature of the compressor M to be less than the first default value, the automatic temperature sensing switch 16 electrically connects the control switch 15. Furthermore, by resetting the interface module 17, the voltage supplied by the power supply P is able to flow, through the rectifier module 11 and the interface module 17, to the passive temperature sensing switch 12 for resetting the passive temperature sensing switch 12. As the passive temperature sensing switch 12 resets, the passive temperature sensing switch 12 allows for an electric connection between the interface module 17 and the processor module 13. This allows the processor module 13 to receive the voltage supplied by the power supply P, and thus allows the processor module 13 to generate and output a control signal to the control module 14. The control module 14 would then generate and output a switch-on control signal to the control switch 15. The control switch 15 obeys the switch-on control signal to start conducting electricity. As a result, an electrical pathway from the power supply P to the compressor M is established, thus allowing the compressor M to execute its functions.

Overall, by having the passive temperature sensing switch 12 of the present invention to immediately sever an electrical connection between the power supply P and the processor module 13 when the compressor M is overheating, the compressor M stops working and stays off without automatically switching back on. This way, the present invention prevents the automatic temperature sensing switch 16 in the processor from repeatedly automatically switching the compressor M on and off in succession as the compressor M overheats and cools down. As a result, the compressor M is more protected from being damaged due to switching on and off in succession, allowing the compressor M to have longer life expectancy.

What is claimed is:

1. A compressor temperature protection module, comprising:
   an automatic temperature sensing switch, installed in a compressor for sensing a first temperature of the compressor, and electrically connected to a control switch of a control module; and
   a passive temperature sensing switch, installed on the compressor for sensing a second temperature of the compressor, and electrically connected between a rectifier module and a processor module;
   wherein the rectifier module is configured to electrically connect to a power supply for rectifying a voltage supplied by the power supply into a voltage signal; the rectifier module outputs the voltage signal to the processor module; the processor module is electrically connected to the control module; the processor module receives the voltage signal and allows the control module to generate a control signal according to the voltage signal; the control module outputs the control signal to the control switch for controlling the control switch to switch on or off according to the control signal;
   wherein when the first temperature is greater than a first default value and the second temperature is greater than a second default value, the automatic temperature sensing switch automatically severs a connection with the control switch of the control module, and the passive temperature sensing switch severs a connection between the rectifier module and the processor module;
   wherein after the automatic temperature sensing switch severs the connection with the control switch of the control module and the passive temperature sensing switch severs the connection between the rectifier module and the processor module, when the first temperature is less than the first default value, the automatic temperature sensing switch electrically connects to the control switch of the control module.

2. The compressor temperature protection module as claimed in claim 1, wherein the passive temperature sensing switch comprises a manual reset mechanical switch.

3. The compressor temperature protection module as claimed in claim 1, wherein the automatic temperature sensing switch comprises an insulator shell, a sealed inner-shell, a first sensing switch pin, a second sensing switch pin, and a temperature sensitive strip;
   wherein the insulator shell encapsulates the sealed inner-shell; a first sensing switch contact of the first sensing switch pin, a second sensing switch contact of the first sensing switch pin, a sensing switch contact of the second sensing switch pin, and the temperature sensitive strip are all enclosed by the sealed inner-shell; wherein the first sensing switch contact is electrically connected to the sealed inner-shell, and thus the first sensing switch contact is electrically connected to the second sensing switch contact through the sealed inner-shell; the temperature sensitive strip has two opposite sides, with one of the two sides fixed and connected to the second sensing switch contact of the first sensing switch pin, and the other side contacting the sensing switch contact of the second sensing switch pin;
   wherein when the automatic temperature sensing switch automatically severs the connection with the control switch, the temperature sensitive strip curls and stops contacting the sensing switch contact of the second sensing switch pin;
   wherein when the automatic temperature sensing switch senses the first temperature of the compressor to be less than the first default value and electrically connects to the control switch of the control module, the temperature sensitive strip un-curls and starts contacting the sensing switch contact of the second sensing switch pin;
   wherein the first sensing switch pin is electrically connected to a load, and the second sensing switch pin is electrically connected to the control switch.

4. A compressor temperature protection system, comprising:
   a rectifier module, configured to electrically connect to a first contact of a power supply, rectifying a voltage supplied by the power supply into a voltage signal;
   a passive temperature sensing switch, installed on a compressor for sensing a second temperature of the compressor, and having a first pin and a second pin; wherein the first pin is electrically connected to the rectifier module;
   a processor module, electrically connected to the second pin of the passive temperature sensing switch, and receiving and processing the voltage signal;
   a control module, electrically connected to the processor module, and generating a control signal according to the voltage signal;
   a control switch, electrically connected to the control module, and configured to electrically connect to a second contact of the power supply; wherein the control switch receives the control signal and switches on or off according to the control signal; and an automatic temperature sensing switch, electrically connected to the control switch, and installed in the compressor for sensing a first temperature of the compressor;

wherein when the first temperature is greater than a first default value and the second temperature is greater than a second default value, the automatic temperature sensing switch automatically severs a connection with the control switch of the control module, and the passive temperature sensing switch severs a connection between the rectifier module and the processor module;

wherein after the automatic temperature sensing switch severs the connection with the control switch of the control module and the passive temperature sensing switch severs the connection between the rectifier module and the processor module, when the first temperature is less than the first default value, the automatic temperature sensing switch electrically connects to the control switch of the control module.

5. The compressor temperature protection system as claimed in claim 4, wherein the passive temperature sensing switch comprises a manual reset mechanical switch.

6. The compressor temperature protection system as claimed in claim 4, wherein the automatic temperature sensing switch comprises an insulator shell, a sealed inner-shell, a first sensing switch pin, a second sensing switch pin, and a temperature sensitive strip;

wherein the insulator shell encapsulates the sealed inner-shell; a first sensing switch contact of the first sensing switch pin, a second sensing switch contact of the first sensing switch pin, a sensing switch contact of the second sensing switch pin, and the temperature sensitive strip are all enclosed by the sealed inner-shell; wherein the first sensing switch contact is electrically connected to the sealed inner-shell, and thus the first sensing switch contact is electrically connected to the second sensing switch contact through the sealed inner-shell; the temperature sensitive strip has two opposite sides, with one of the sides fixed and connected to the second sensing switch contact of the first sensing switch pin, and the other side contacting the sensing switch contact of the second sensing switch pin;

wherein when the automatic temperature sensing switch automatically severs the connection with the control switch, the temperature sensitive strip curls and stops contacting the sensing switch contact of the second sensing switch pin;

wherein when the automatic temperature sensing switch senses the first temperature of the compressor to be less than the first default value and electrically connects to the control switch of the control module, the temperature sensitive strip un-curls and starts contacting the sensing switch contact of the second sensing switch pin;

wherein the first sensing switch pin is electrically connected to a load, and the second sensing switch pin is electrically connected to the control switch.

7. The compressor temperature protection system as claimed in claim 4, wherein the rectifier module, the processor module, the control module, and the control switch are all mounted on a circuit board.

8. The compressor temperature protection system as claimed in claim 7, wherein the circuit board comprises:

an interface module, electrically connect between the rectifier module and the passive temperature sensing switch;

wherein after the passive temperature sensing switch is disconnected from the rectifier module and the processor module, by resetting the interface module, the voltage supplied by the power supply is able to once again flow through the rectifier module and the interface module to reach the passive temperature sensing switch.

* * * * *